United States Patent
Harrold et al.

(10) Patent No.: US 8,179,425 B2
(45) Date of Patent: May 15, 2012

(54) ALIGNMENT OF ELEMENTS OF A DISPLAY APPARATUS

(75) Inventors: Jonathan Harrold, Warwick (GB); Graham John Woodgate, Henley-on-Thames (GB)

(73) Assignee: AU Optronics Corp., Hsinchu (TW)

( * ) Notice: Subject to any disclaimer, the term of this patent is extended or adjusted under 35 U.S.C. 154(b) by 1893 days.

(21) Appl. No.: 10/563,119

(22) PCT Filed: Jul. 9, 2004

(86) PCT No.: PCT/GB2004/002995
§ 371 (c)(1),
(2), (4) Date: Jan. 3, 2006

(87) PCT Pub. No.: WO2005/006064
PCT Pub. Date: Jan. 20, 2005

(65) Prior Publication Data
US 2006/0158511 A1    Jul. 20, 2006

(30) Foreign Application Priority Data
Jul. 10, 2003  (GB) .................. 0316220.3

(51) Int. Cl.
*H04N 15/00*  (2006.01)
(52) U.S. Cl. .......................... 348/51; 348/42
(58) Field of Classification Search .......... 348/42, 348/51; 250/221; 349/146, 201
See application file for complete search history.

(56) References Cited

U.S. PATENT DOCUMENTS

| | | | |
|---|---|---|---|
| 5,331,149 A * | 7/1994 | Spitzer et al. | 250/221 |
| 5,850,276 A | 12/1998 | Ochi et al. | |
| 6,124,920 A * | 9/2000 | Moseley et al. | 349/201 |
| 6,295,107 B1 | 9/2001 | Watanabe et al. | |
| 6,330,107 B1 | 12/2001 | Mattijetz | |
| 6,515,800 B1 | 2/2003 | Border et al. | |
| 6,771,345 B2 * | 8/2004 | Liu et al. | 349/146 |
| 2003/0231277 A1 | 12/2003 | Zhang | |

FOREIGN PATENT DOCUMENTS

| | | |
|---|---|---|
| EP | 1 176 435 A1 | 1/2002 |
| WO | WO 03/015424 A2 | 2/2003 |

* cited by examiner

*Primary Examiner* — Allen Wong
(74) *Attorney, Agent, or Firm* — Thomas, Kayden, Horstemeyer & Risley, LLP

(57) ABSTRACT

To align a display substrate comprising an array of pixels with a component substrate comprising an array of optical components, the display substrate is divided from a display motherglass formed with an array of panels each comprising an array of pixels sufficient for a single display substrate and with, in respect of each panel, a first alignment feature having a surface relief aligned with the array of pixels. The component substrate is formed with an array of optical components and a second alignment feature aligned with the array of optical components, the second alignment feature having a surface relief shaped to register with the first alignment feature. The display substrates is attached to the component substrate with the first and second alignment features in registration with each other. The alignment of the first alignment feature with the array of pixels may be carried out at the motherglass stage in respect of the entire motherglass. The registration of the alignment features during attachment is a straightforward mating process which does not require precision alignment apparatus. Thus the yield can be increased.

45 Claims, 7 Drawing Sheets

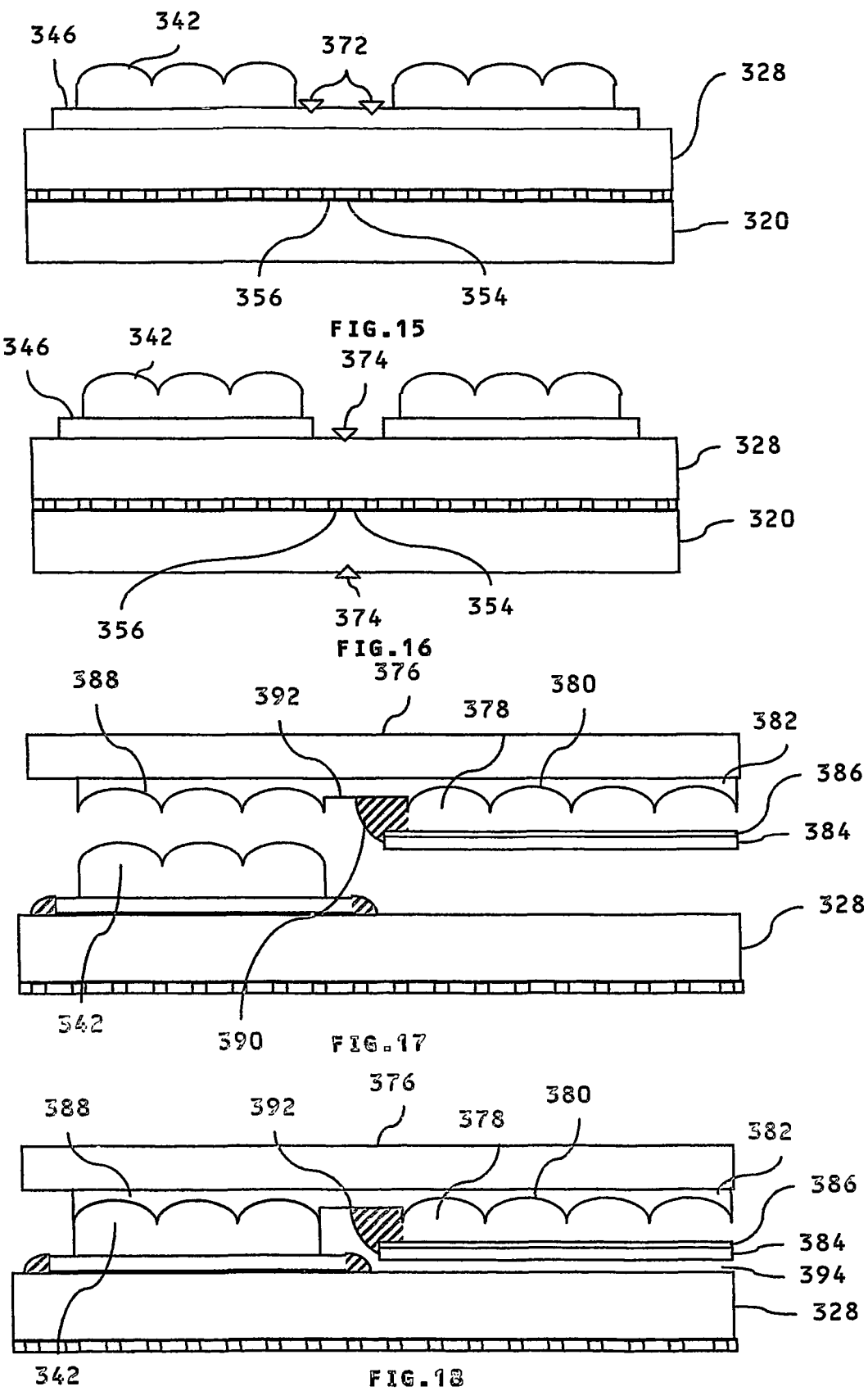

ALIGNMENT OF ELEMENTS OF A DISPLAY APPARATUS

BACKGROUND OF THE INVENTION

The present invention relates to display apparatuses. The display apparatus may be a directional display apparatus such as a switchable two dimensional (2D)/three dimensional (3D) autostereoscopic display apparatus; a switchable high brightness reflective display apparatus; or a multi-user display apparatus. Such display apparatuses may be used in computer monitors, telecommunications handsets, digital cameras, laptop and desktop computers, games apparatuses, automotive and other mobile display applications.

In particular, the present invention relates to the alignment of elements of a display apparatus, that is the alignment of a display substrate comprising an array of pixels with a component substrate comprising an array of optical components, such as lenses.

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2.

FIG. 2a shows a display device 16 with an attached parallax optical element 17. The display device produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display device 16 produces a left eye image 26 for the left eye channel. The parallax optical element 17 directs light in a direction shown by the arrow 28 to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display device 16,17 in a display plane 34 producing the left eye viewing windows 36,37,38 and right eye viewing windows 39,40,41 in the window plane 42. The separation of the window plane from the display is termed the nominal viewing distance 43. The windows 37,40 in the central position with respect to the display are in the zeroth lobe 44. Windows 36,39 to the right of the zeroth lobe 44 are in the +1 lobe 46, while windows 38,41 to the left of the zeroth lobe are in the −1 lobe 48.

The viewing window plane of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width.

If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 4a. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 4b shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The quality of the separation of images and the extent of the lateral and longitudinal viewing freedom of the display is determined by the window quality, as illustrated in FIG. 4. FIG. 4a shows the ideal viewing windows while FIG. 4b is a schematic of the actual viewing windows that may be outputted from the display. Several artefacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. The optical system is designed to optimised the performance of the viewing windows.

The parallax element may be a parallax barrier comprising an array of opaque regions alternating with transmissive regions. Parallax barriers rely on blocking the light from regions of the display and therefore reduce the brightness and device efficiency, generally to approximately 20-40% of the original display brightness. Parallax barriers are not readily removed and replaced due to the requirements of sub-pixel alignment tolerances of the barrier with respect to the pixel structure of the display in order to optimise the viewing freedom of the display. The 2D mode is half resolution.

Another type of parallax optic alternative to a parallax barrier well known in the art for use in stereoscopic displays is a lenticular screen, which is an array of vertically extended cylindrical microlenses.

FIG. 5 shows a typical structure of a prior art display device using a lenticular screen. A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68,71,73, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 74 and in colour by a colour filter positioned on an LCD colour filter substrate 80. The light then passes through an output polariser 82 after which is placed a lenticular screen substrate 94 and a lenticular screen 96 which is formed on the surface of the lenticular screen substrate 92. As for the parallax barrier, the lenticular screen 94 serves to direct light from alternate pixel columns 69,71,73,75 to the right eye as shown by the ray 88 from the pixel 69 and from the intermediate columns 68,70, 72,74 to the left eye as shown by the ray 90 from pixel 68. The observer sees the light from the underlying pixel illuminating the aperture of the individual lenticule, 98 of the lenticular screen 96. The extent of the captured light cone is shown by the captured rays 100.

In the above arrangement, the LCD pixel plane acts as a spatial light modulator (SLM). As used in this document, the term spatial light modulator or SLM includes both 'light valve' devices such as liquid crystal displays and emissive devices such as electroluminescent displays and LED displays.

As described above, the use of parallax optics to generate a spatially multiplexed 3D display limits the resolution of each image to at best half of the full display resolution. In many applications, the display is intended to be used for a fraction of the time in the 3D mode, and is required to have a full resolution artefact free 2D mode.

An example of a switchable 2D-3D display is described in is shown in plan view in FIG. 6. A backlight 102 produces illumination 104 of an LCD input polariser 106. The light passes through a thin film transistor (TFT) substrate 108 and is incident on a pixel layer 110 comprising individually controllable phase modulating pixels 112-126. The pixels are arranged in rows and columns and comprise a pixel aperture 128 and a separating black mask 130. The light then passes through an LCD counter substrate 132 and a lens carrier substrate 136 upon which is formed a birefringent microlens array 138. The birefringent microlens array 138 comprises an isotropic lens microstructure 140 and an aligned birefringent material with an optical axis direction 142. The output of the birefringent lens then passes through a lens substrate 144 and a polarisation modifying device 146.

Each birefringent lens of the lens array is cylindrical; the lens array 138 is a lenticular screen and the geometrical axis of the lenses is out of the page. The pitch of the lenses in this example is arranged to be substantially twice the pitch of the pixels of the display such that a two view autostereoscopic display is produced.

In a first mode of operation, the polarisation modifying device 146 is configured to transmit light with a polarisation state which is parallel to the ordinary axis of the birefringent material of the microlens array. The ordinary refractive index of the material (such as a liquid crystal material) is substantially matched to the index of the isotropic microstructure 140. Thus the lenses have no optical effect and there is substantially no change to the directional distribution of the output of the display. In this mode, an observer will see all the pixels 112-126 of the display with each eye, and a 2D image will be produced.

In a second mode of operation, the polarisation modifying device 146 is configured to transmit light with a polarisation state which is parallel to the extra-ordinary axis of the birefringent microlens array. The extraordinary refractive index of the material (such as a liquid crystal material) is different to the index of the isotropic microstructure 140. Thus the lenses have an optical effect and there is a change to the directional distribution of the output of the display. This directional distribution can be set as well known in the art so as an observer correctly positioned at the front of the display will see a left image in their left eye corresponding to light from left image pixels 112,116,120,124 and in their right eye will see a right image corresponding to right image pixels 114,118,122,126. In this way, a switchable 2D to 3D autostereoscopic display can be produced.

Lens arrays are particularly suitable for autostereoscopic displays because they combine the functionalities of high efficiency, small spot size and ability to manufacture using well known lithographic processing techniques.

It is known to provide electrically switchable birefringent lenses for purposes of switching light directionally. It is known to use such lenses to switch a display between a 2D mode of operation and a 3D mode of operation.

In a 3D autostereoscopic display, a lens array (or lenticular screen) may be used to direct the light into a directional distribution consisting of the appropriate viewing windows. This type of lens array may also be used to direct light into other directional distributions. Examples of such directional distributions are disclosed in WO-03/015,424 and include an enhanced brightness distribution in which light is directed into broad horizontal windows in the nominal viewing plane.

In the window, the observer will see an increase of brightness proportional to the vertical aperture ratio of the panel. Out of the viewing window, an observer will see the gaps between the pixels, and the display has reduced brightness.

FIG. 8 shows the relative alignment of the lenses of an autostereoscopic two view display to the pixels in order to achieve the required alignment at various points across the display surface. For simplicity of explanation, the lenses are shown in overhead view, while the pixels are marked with their relative alignment to the lenses in plan view. For simplicity of illustration, only selected panel pixels are shown.

In an ideally aligned two view 3D autostereoscopic display, light rays 300 from the centre of the gap between the right eye pixel columns 304 and left eye pixel columns 302 is directed by a first adjacent lens 312 to the window centre as shown in FIG. 8. In order to achieve this, the position of the lens geometric axis is directly over the centre of the pixel gap for the central lens 306, while for lenses at the edge of the display 308, 310, the geometric lens axis position 318 is towards the centre of the display from the centre of the pixel gap 314. Such an alignment condition is known as viewpoint correction.

In manufacture, alignment tolerances of the devices must be met so that the display can be comfortably viewed. In particular, the lateral lens optical axis position is preferably aligned to the respective pixel aperture to within less than for example 5% of the pixel size.

If the window centre is not aligned on the centre line of the display, then the viewer may experience discomfort when viewing the stereo image, and may additionally find the best viewing position is off-centre of the display. For many display types, such as for example those with colour sub-pixel sizes in the region 40-1001 µm in horizontal pitch this requires an alignment tolerance of the geometric lens axis to the panel pixel layout of 2-5 µm across the display area, and is similar to the alignment tolerances of colour filter substrates to TFT substrates.

If the geometric lens axis 306 is not parallel to the pixel vertical axis 316, then the window centre will vary down the height of the panel. This will result in a reduction of viewing freedom of the panel which is highly undesirable.

Other autostereoscopic display systems well known in the art use arrays of other types of optical component for example switchable liquid crystal lens arrays, fixed lens arrays, prism arrays, aperture arrays (known as parallax barriers) and hologram arrays. All of these devices require similar alignment tolerances of the micro-optic component to the display device pixels.

Displays showing more than two views including those in which cylindrical lenses are tilted with respect to the pixel columns are also known in the art. In this case, it is desirable that the viewing window centre is aligned with the display centre line so that the viewing freedom is symmetric about a central viewing position.

BRIEF SUMMARY OF THE INVENTION

According to the present invention, there is provided a method of aligning display substrates comprising an array of pixels with component substrates comprising an array of optical components, the method comprising:

forming a display motherglass with an array of panels each comprising an array of pixels sufficient for a single display substrate and with, in respect of each panel, a first alignment feature having a surface relief aligned with the array of pixels;

dividing the display motherglass into display substrates each comprising an array of pixels and a first alignment feature;

forming component substrates each with an array of optical components and a second alignment feature having a surface relief aligned with the array of optical components, the surface relief of the second alignment feature being shaped to register with the surface relief of the first alignment feature; and attaching the display substrates to respective component substrates with the first and second alignment features in registration with each other.

Manufacture of plural display substrates from a single motherglass is a known technique which significantly reduces production costs. Similarly one could manufacture plural component substrates from a single motherglass. However, it is highly desirable to divide the display and component motherglasses before attachment because of the nature of the division process, typically involving scoring and stressing the motherglasses. Therefore it is not possible to align the display and component substrates at the motherglass stage.

The use of alignment features in the present invention allows the alignment of the optical elements to be fixed during manufacture of the display motherglass and thus be applied to plural panels simultaneously. The registration of the component substrates to individual display substrates is a straightforward mechanical registration or mating process and is thus requires only low tolerances by virtue of the alignment features already provided. Use of high precision alignment apparatus is not necessary. Therefore the manufacture is significantly cheaper than it would be if high precision alignment were performed at the time of attaching each component substrate to a display substrate. Thus the present invention provides a relatively low cost technique for providing the alignment during manufacture.

The present invention is suitable for large scale fabrication of 3D autostereoscopic display apparatuses, or enhanced brightness display apparatuses or switchable 2D-3D display apparatuses without requiring the complexity of cutting multiple glass layers, while providing an accurate and low cost alignment with respect to a pixel structure of optical components in the form of parallax optical elements. Thus, the present invention may be applied to numerous types of display apparatus including: an autostereoscopic display alignment apparatus; a switchable high brightness transflective or reflective display system alignment apparatus; or a multi-viewer display apparatus.

The optical component may be of any type, but the invention is particularly applicable to an optical component in the form of a lens or other component for altering the directional distribution of light from the pixels of the display substrate.

Advantageously, the first alignment feature has an optical function, which may be representative of the optical function of the optical components. In this case, the first alignment features may be attached to the display motherglass using an optical alignment technique. For example, this may comprise measuring fiducial marks on the respective elements to produce a position signal, illuminating the first alignment feature to produce an optical spot substantially at the plane of the array of pixels, changing the direction of the illumination and using a detector to measure the change in intensity with respect to illumination direction and produce a position signal.

To reduce costs further the component substrates may be divided from a component motherglass.

The second alignment feature may be formed in a common layer with part of the structure of the optical component. This allows the second alignment feature and that part of the structure of the optical component to be produced in a single manufacturing step. Thus the second alignment feature may be introduced without any additional cost to the manufacture. Also, by fabricating the second alignment feature at the same time as the optical components, then high precision alignment tolerances can be maintained.

Advantageously, the surface reliefs of the first and second alignment features repeat in the same direction in which the optical components repeat at a pitch substantially equal to the pitch of the optical components or an integer multiple of the pitch of the optical components.

In this way, the alignment features may register at a plurality of relative positions in each of which the display and component substrates are aligned. Thus the required tolerance for attaching the display and component substrates is reduced, further reducing manufacturing complexity and cost.

According to another aspect of the present invention, there is provided an optical alignment apparatus comprising:
 a display substrate upon which an array of pixels is formed;
 a display substrate alignment element which comprises an array of micro-structured surfaces and is attached in registration to the display substrate array of pixels;
 a micro-optical substrate comprising at least one micro-optical imaging element arranged in at least one mode to modify the directional distribution of the light from the display; and
 a micro-optical substrate alignment element which comprises an array of micro-structured surfaces,
 wherein the micro-optical substrate alignment element has substantially the inverse microstructure to the display substrate alignment element over at least one portion of its area, and, in an assembly step, the micro-optical alignment element is substantially aligned in mechanical registration to the micro-optical substrate alignment element.

According to further aspects of the invention, there are provided display and component substrates and motherboards for use in the method.

Embodiments of the present invention will now be described, by way of example only, with reference to the accompanying drawings, in which:

FIG. 15 shows the scribing of the alignment feature;

FIG. 16 shows the scribing of the motherglass;

FIG. 17 shows the assembly of the panel to the assembled lens array;

FIG. 18 shows the assembled structure of the panel; and

DETAILED DESCRIPTION OF THE INVENTION

Figure 1A:
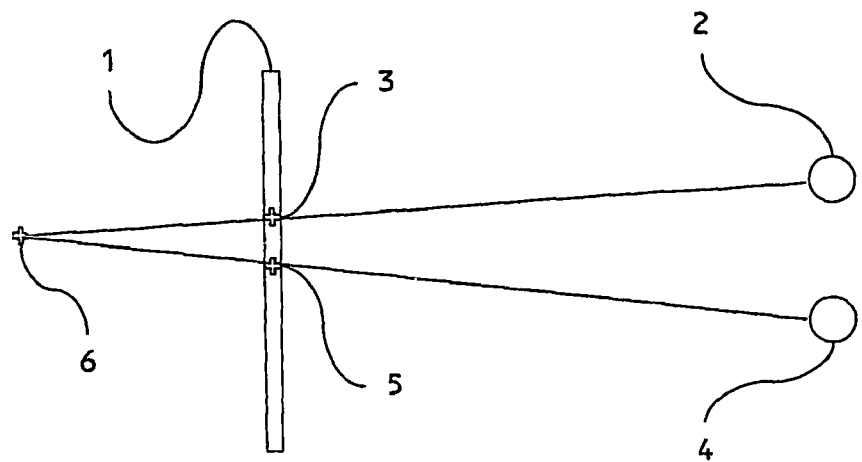
FIG. 1a shows the generation of apparent depth in a 3D display for an object behind the screen plane.
Figure 1B:
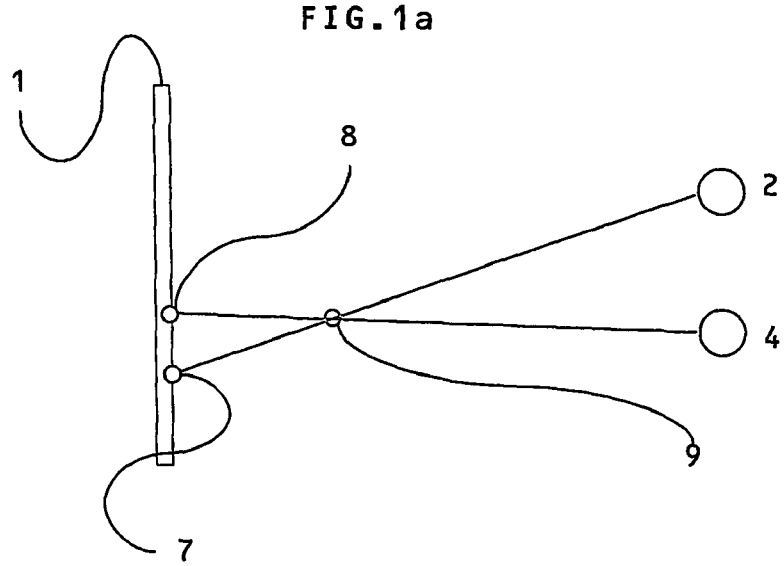
FIG. 1b shows the generation of apparent depth in a 3D display for an object in front of the screen plane.
Figure 1C:
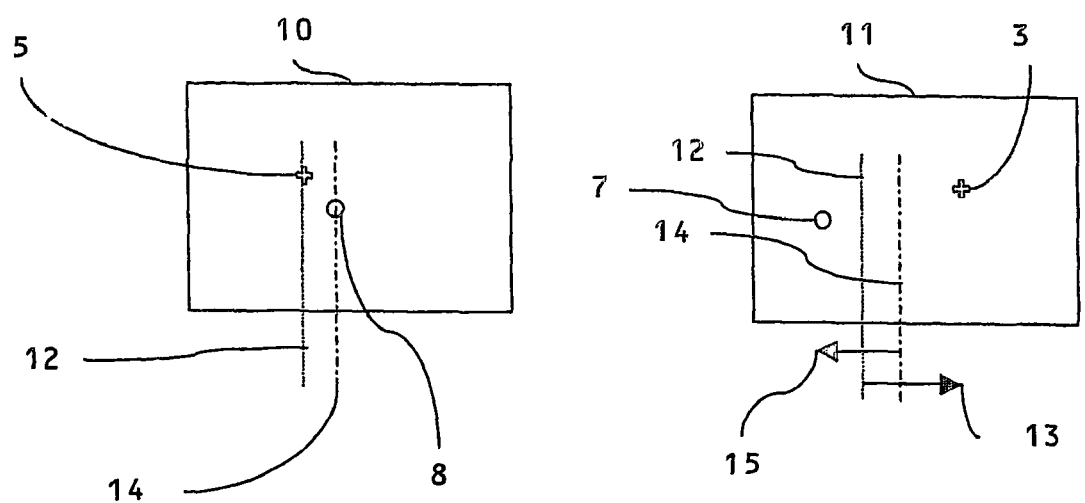
FIG. 1c shows the position of the corresponding homologous points on each image of a stereo pair of images.
Figure 2A:
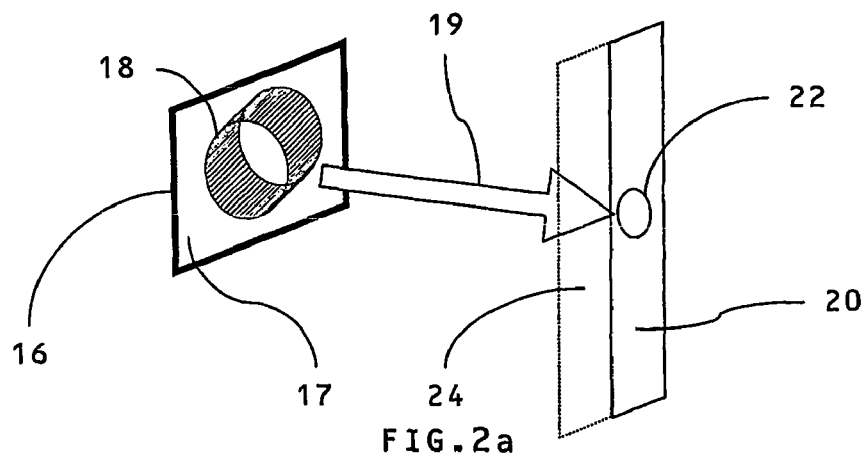
FIG. 2a shows schematically the formation of the right eye viewing window in front of an autostereoscopic 3D display.
Figure 2B:
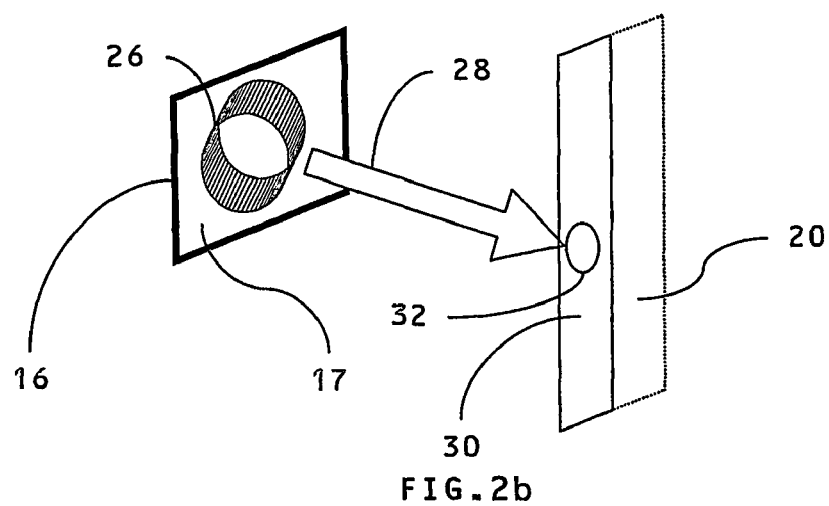
FIG. 2b shows schematically the formation of the left eye viewing window in front of an autostereoscopic 3D display.
Figure 3:
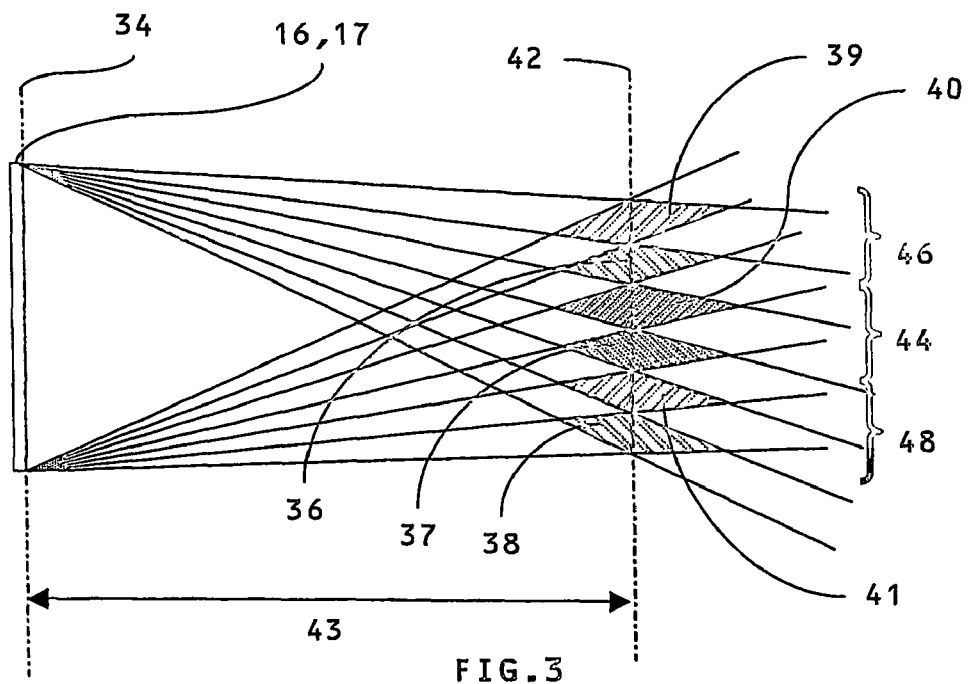
FIG. 3 shows in plan view the generation of viewing zones from the output cones of a 3D display.
Figure 4A:
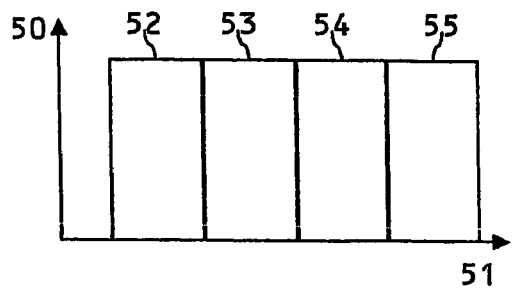
FIG. 4a shows the ideal window profile for an autostereoscopic display.
Figure 4B:
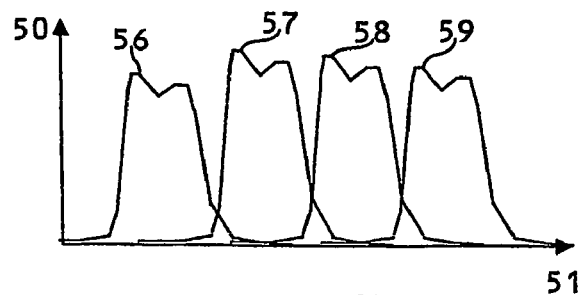
FIG. 4b shows a schematic of the output profile of viewing windows from an autostereoscopic 3D display.
Figure 5:
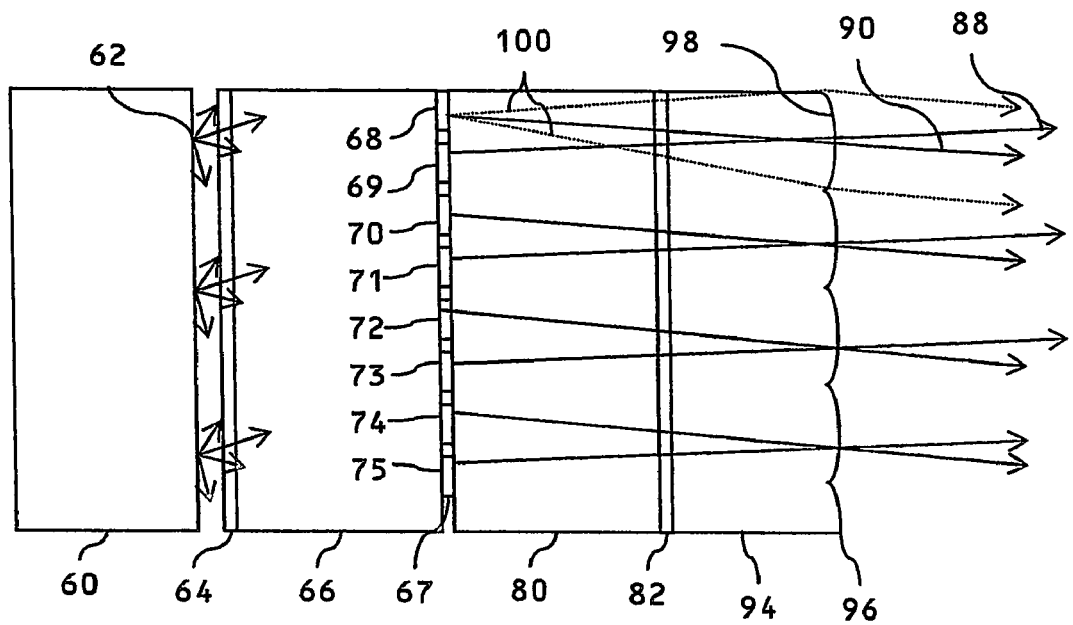
FIG. 5 shows the structure of a lenticular screen display.
Figure 6:
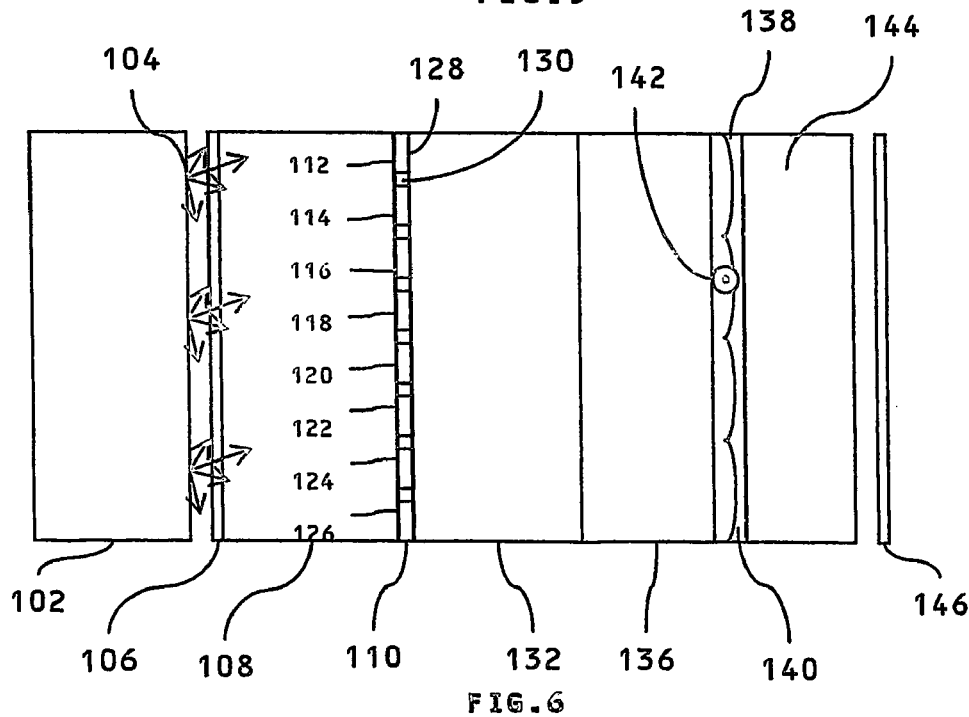
FIG. 6 shows a prior art polarisation activated microlens display.

Some of the various embodiments employ common elements which, for brevity, will be given common reference numerals and a description thereof will not be repeated. Furthermore the description of the elements of each embodiment applies equally to the identical elements of the other embodiments and the elements having corresponding effects, mutatis mutandis. Also, the figures illustrating the embodiments which are displays show only a portion of display, for clarity. In fact, the construction is repeated over the entire area of the display.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

A cylindrical lens describes a lens in which an edge (which has a radius of curvature and may have other aspheric components) is swept in a first linear direction. The geometric microlens axis is defined as the line along the centre of the lens in the first linear direction, i.e. parallel to the direction of sweep of the edge. The term "cylindrical" as used herein has its normal meaning in the art and includes not only strictly spherical lens shapes but also aspherical lens shapes.

In a 2D-3D type display, the geometric microlens axis is vertical, so that it is parallel or at a slight angle to the columns of pixels of the display. In a brightness enhanced display as described herein, the geometric microlens axis is horizontal so that it is parallel to the rows of the pixels of the display.

The pitch of the lenses in a lens array for a two view 3D autostereoscopic display is substantially equal to twice the pitch of the pixels of a spatial light modulator with which the lens array is to be used. In fact the pitch of the lenses in a lens array is slightly less than twice the pitch of the pixels of the spatial light modulator to steer the light to the viewing window in way commonly known as "viewpoint correction". The curvature of the lenses is set substantially so as to produce an image of the LCD pixels at the window plane. As the lenses collect the light in a cone from the pixel and distribute it to the windows, lens arrays provide the full brightness of the incident light.

Figure 9:
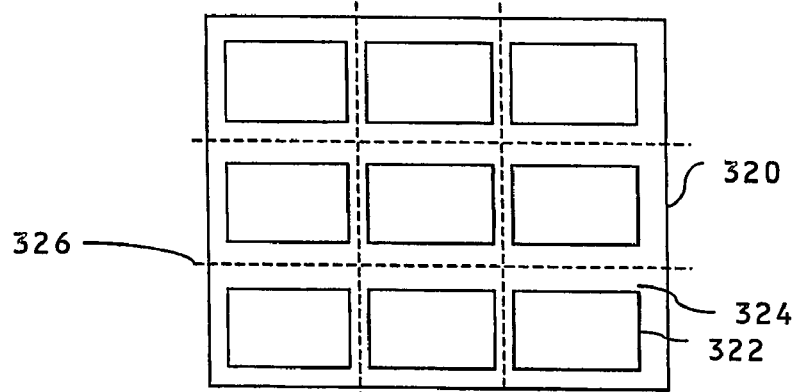
FIG. 9 shows the layout of a conventional LCD motherglass in plan view.

TFT-LCD glass substrates are generally processed in motherglass form as shown in plan view in FIG. 9. The motherglass 320 comprises an array of panel regions 322. Each panel region 322 comprises an array of visible pixels for a single display, the individual pixels including TFTs for example. Thus, the TFTs for an array of displays are processed on a single glass substrate. Between the panel regions 322, the motherglass 320 has gap regions 324 in which scribe lines 326 are made for multiple panel regions 322. A similar construction is made for the colour filter motherglass 328. The colour filter motherglass 328 is also referred to as the counter substrate to the TFT, or active matrix substrate 320.

Figure 10:
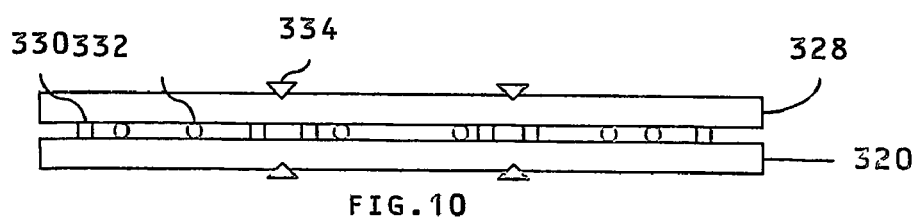
FIG. 10 shows the structure of a conventional LCD motherglass in side view.

This allows for processing of multiple panels simultaneously, prior to cell assembly, reducing overall cost. In practice, such motherglass processing is required to obtain sufficiently low costs for high volume manufacture. Following the completion of processing on each motherglass 320, a patterned adhesive 330 may be applied to one surface around the area of each individual panel within the motherglass, as illustrated in cross section in FIG. 10, with spacer balls 332 to maintain the optimum separation of the two motherglasses. The other motherglass is positioned in alignment and the adhesive 330 is then cured. The use of motherglass is particularly advantageous as the high precision alignment is carried out simultaneously on a number of panels. Multiple alignments would significantly increase the cost of panel assembly.

The individual panels may subsequently be separated by means of scribing along the scribe lines 326 with a tool 334. This may be by well known glass cutting techniques in which the outer surface of each motherglass are scored, for example using a diamond scribe or a laser, in registration and the glass may be stressed to create a propagating crack in each glass substrate which is used to separate the panel. The panels are subsequently filled with a liquid crystal material and sealed. Alternatively, the One Drop Fill mechanism may be employed. In this case, the cell attachment may be by UV curing of a suitable material mixed within the liquid crystal fill material.

Figure 11:
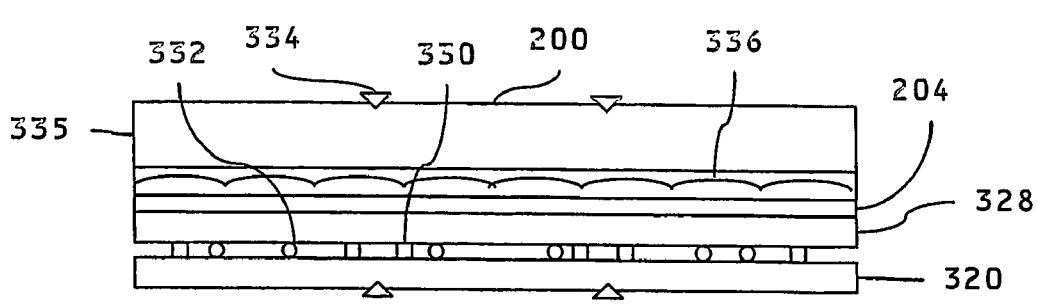
FIG. 11 shows the structure of a switchable 2D-3D motherglass in side view.

FIG. 11 shows the structure of an assembled switchable 2D-3D if it were to be made in motherglass form. A TFT substrate 320 comprising an array of separate panels is attached to a colour filter substrate 328 by means of a patterned adhesive 330 and separation is maintained by means of spacers 332. On the top surface of the colour filter substrate, a passive birefringent lens element comprising one kind of 3D autostereoscopic optical element is attached. This comprises a lens counter substrate 204 and the optical microstructure 336 comprising a surface relief microstructure defining the boundary between an isotropic material and a birefringent material. This is attached to a lens substrate 200. During separation of the panels, scribe tool 334 could be set to score the surfaces of substrates 320 and 335.

In some configurations, additional waveplates and polarisers (not shown) may be positioned in layers between the colour filter substrate 328 and the lens counter substrate 204.

It is assumed that the lens array is preferably made on a large motherglass to reduce the cost of handling large numbers of separate elements, in the same way as the TFT and colour filter substrates. A motherglass alignment would be a preferred approach because the alignment of the optical microstructure 336 to the pixels in formed on the TFT substrate 320 is of a similar tolerance as the alignment of the colour filter substrate 328 to the TFT substrate 320. Therefore, a large number of simultaneous alignments will reduce the cost of the assembled display. This is particularly advantageous for the production of small panels, such as those used in mobile phones for example.

However, in the case of the switchable 2D-3D display as described in FIG. 11, there are multiple layers, and therefore it is not possible to score the colour filter substrate 328 or the lens counter substrate 204 at the same time as the lens substrate 200 and the TFT substrate 320 using a scribe tool 334. Of particular difficulty is that the optical microstructure 336 is generally fabricated from at least one polymer material. Thus the structure is likely to be a laminate and will be separated with difficulty.

In some configurations, the birefringent lens may also comprise a lens counter substrate 204, which again will not be easily scored for separation.

One approach to resolve this problem would be to pre-score the colour filter substrate prior to assembly with the lens array substrates. For the lens array, the polymer material may also be removed in the score regions and the lens counter substrate 204 may be pre-scored prior to assembly. However, this will create fragile components which may be prone to breakage during handling, and therefore reduce the yield of the process.

A further disadvantage of this approach is that the LCD assembly line would have to be substantially modified to accommodate the new processes, which would increase cost of conventional 2D panels to be fabricated on the same line.

A further disadvantage of this approach is that the lens substrate 200 will require the lenses to be in registration over the entire area of the lens motherglass. The pitch tolerance of the lenses may be of the order of 25 nm and therefore the lenses may be manufactured using lithographic techniques in order to maintain these tolerances. The lenses may then be transferred to a recombined shim, in which the relative position of the lens arrays must be set accurately to allow the correct alignment of the lens motherglass to the panels over the entire area. It would be preferable that the errors that occur in recombined shims are not present in the positioning of the lens arrays. Advantageously the present invention avoids the recombination alignment errors.

Figure 12:
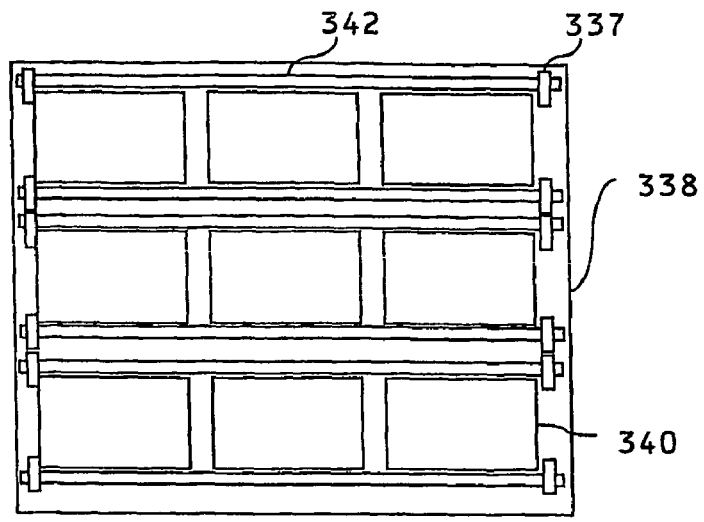
FIG. 12 shows the structure of an LCD motherglass in plan view as an embodiment of the invention.
Figure 13:
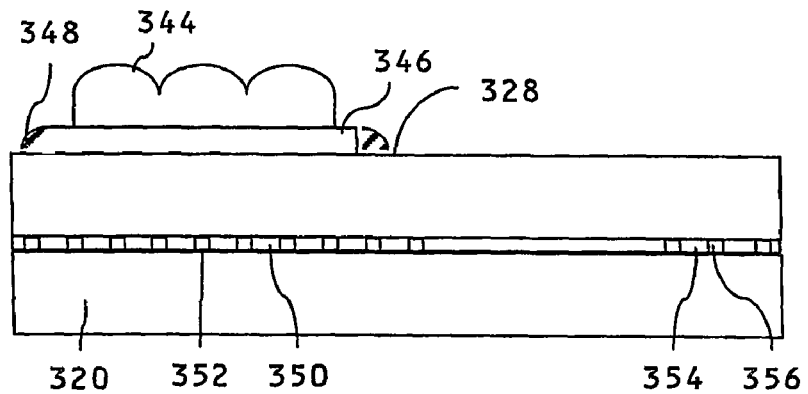
FIG. 13 shows the positioning of an alignment structure on the assembled motherglass.

FIG. 12 shows in plan view a first embodiment of the invention in which an alignment structure 342 is attached to the top surface of the assembled display motherglass 338 comprising substrates 320 and 328 as shown in FIG. 13. The motherglass 338 has an array of panel regions 340 each comprising an array of visible pixels including for example TFTs. The motherglass 338 has gap regions between the panel regions 340. The gap regions have no visible pixels. Typically the gap regions are absent of TFTs or other light modulating elements. As an alternative, the gap regions may be formed with TFTs or light modulating elements, but masked behind a black mask layer so that they are not visible. The alignment microstructure 342 is formed on the motherglass 338 in the gap regions outside the panel regions. Measurement regions 337 are formed in areas of the alignment regions 342.

FIG. 13 shows in side view a detail of the alignment structure 342 and substrates 320, 328, which are an active matrix substrate 320 and a counter substrate 328. The alignment structure 342 comprises an alignment feature 344 and an optional alignment feature substrate 346 attached to one of the motherglass substrates 320,328 for example the colour filter motherglass 328 by means of an adhesive material 348. The substrate 346 can maintain the dimensional stability of the alignment feature 344. For example, the substrate 346 may comprise a glass Microsheet material of thickness 50-150 μm. Alternatively, the alignment feature 344 may be applied directly to one of the motherglass substrate 320, 328 in the required regions by means for example of a UV casting method in which a UV curable material is applied to the substrate prior to casting by a mould and subsequently illuminated by UV radiation to cure the polymer material.

The alignment feature 344 has a surface relief, in this case comprising an optical microstructure. In particular the optical microstructure may be the inverse form (i.e. a mating) optical microstructure to that incorporated in the lens array substrate 376 described in more detail below. Thus, this will have substantially the same pitch as the lenses of the lens substrate. The motherglass 328 may comprise pixel apertures 350 and gaps 352 which may comprise a black mask layer under the alignment region of the motherglass 338 on which the alignment feature 344 is arranged. The pixel apertures 350 and gaps 352 may be the same as the pixel apertures 354 and gaps 356 of the panel region 340, or may be different, for example omitting colour filters.

Figure 7:
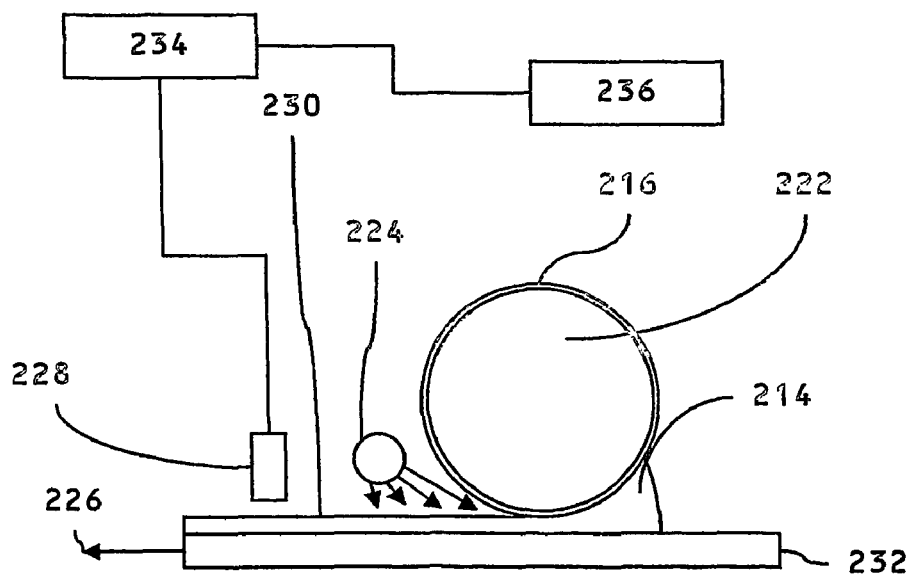
FIG. 7 shows an apparatus for replication of liquid crystal polymer structures.

FIG. 7 shows one example of an apparatus to apply the alignment features of this aspect of the invention directly to the motherglass 328. A shim 216 is wrapped around a drum 222 and a substrate comprising the motherglass 232 is passed under the rotating drum in a direction 226. A pool of curable liquid crystal material 214 is fed on top of the substrate 232 and cured by a UV lamp 224. The cured substrate 230 is examined by an optical inspection tool 228 which determines that the correct alignment of the tool 216 with respect to the base substrate 232 has been achieved. An error signal is sent to a positioning controller 234 which corrects for position errors the control of the tool 216 or substrate 232 by means of a mechanical position actuator 236.

Figure 14:
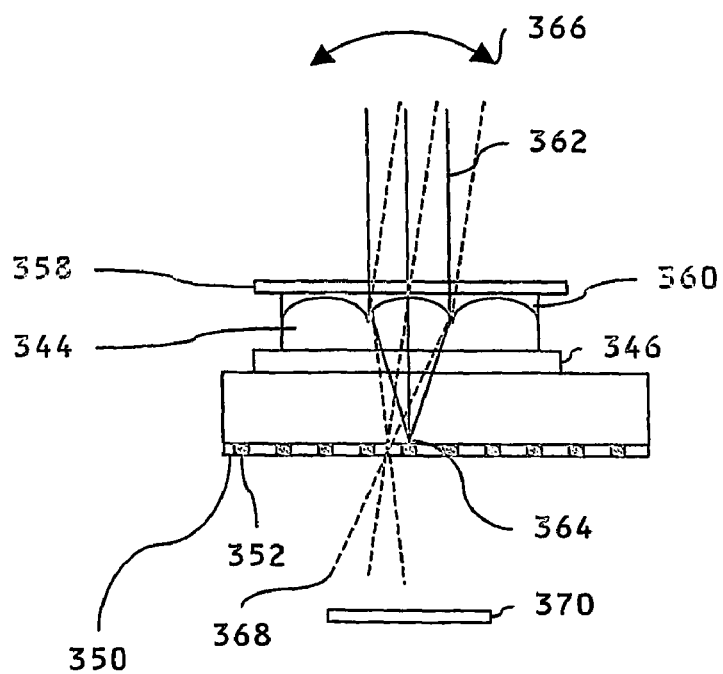
FIG. 14 shows one apparatus for determining the optimum alignment of the alignment structure.

The alignment structure 342 is required to be positioned in the correct alignment with respect to the pixels of the panels 340. As shown for example in FIG. 14, this may be achieved in the measurement regions 337 for example by means of a cover slip 358 attached to the alignment feature 344, and the gap filled using a low refractive index material 360. In this way, advantageously the lenses in the measurement region 337 can be configured to have the same optical power as the lenses of the lens array. Alternatively the curvature of the lens 344 in the measurement region can be configured to have the same optical power as the lenses of the lens array when operating in air without the cover glass 358 and material 360. For example, the radius of curvature of the lens 344 may be larger than the radius of curvature of the lenses of the lens array.

The lens is illuminated, for example by a collimated laser beam 362, so an optical spot 364 will be formed substantially at the plane of the pixels of the display. If the angle of the illumination beam is varied by a scanning system 366 for example, then the spot will cross from the pixel aperture region to the black mask region. By monitoring the intensity of the transmitted light 368 through the rear of the motherglass using an optical detector 370, an accurate measurement of the lens position can be obtained. The physical position of the structure 342 is then adjusted so that it is set in the correct position for the subsequent alignment stage.

Alternatively, the measurement system could be set to operate in reflection. For example the lenses can be illuminated by a collimated laser beam, and imaged on to the pixel plane. Defined reflective regions in the pixel plane can reflect light back through the lens which is split by a beamsplitter cube and directed towards a photodetector. The position of the display with respect to the lens can thus be measured as before.

This is repeated for a number of measurement regions 337 across the structure 342. When the position of the structure is set, then an adhesive 328 may be applied to selected regions and fixed for example by UV curing.

Alternatively fiducial marks can be applied to the alignment features and aligned with respect to the panel by telecentric measurement systems, as well known in the art.

In the panel gap regions, the alignment structure 342 may be removed using scribes 372, for example as shown in FIG. 15. The alignment feature substrate 346 has regions of alignment feature and no alignment feature. Adhesive is preferably omitted from the no alignment feature region. In the alignment gap region, a scribe is used to remove the alignment feature substrate 346 material. The colour filter substrate may then be scribed together with the TFT substrate by scribes 374 for separation of the completed panel as shown in FIG. 16.

The panels regions 340 are separated to form individual display substrates with the alignment structures 342 attached to the top and bottom, outside the panel region 340. These are then used to align to the lens structure as will now be described.

As shown in FIG. 17, the lenses are configured as a birefringent lens over a portion of the area of the lens substrate 376 which will cover the active area of the display. The lenses comprises a birefringent material 378 such as a liquid crystal material sandwiched between an optical microstructure 380 formed in an isotropic material 382 and an optional plane substrate 384 with an alignment layer 386 formed on it. The optical microstructure 380 may also have an alignment layer (not shown) formed on its surface. The optical microstructure 380 comprises the lens region and the alignment region 388. An adhesive 390 may optionally be used to retain the birefringent material between the optical microstructure and lens array counter substrate 384.

Figure 8:
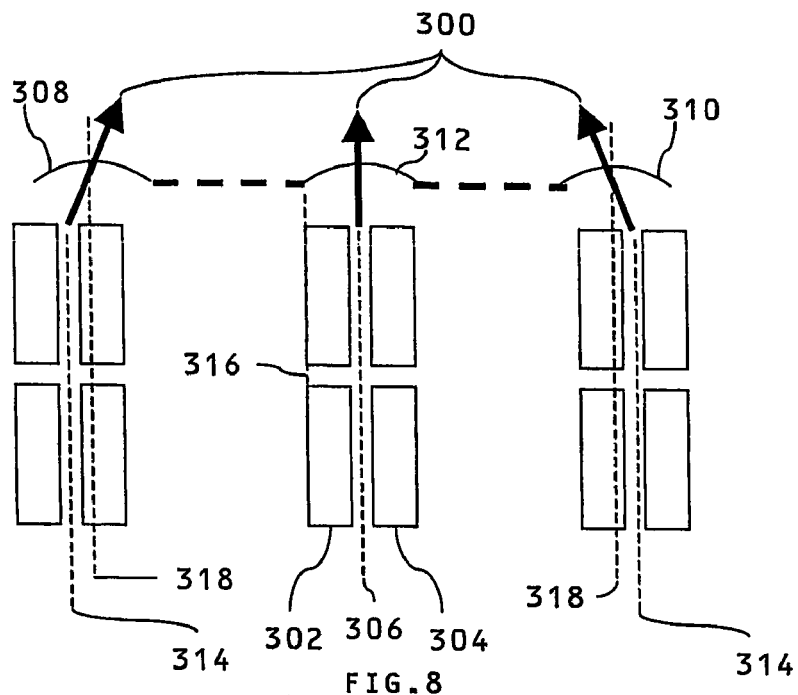
FIG. 8 shows the relative alignment of lenses and pixels in an autostereoscopic display.

The substrate 376 may be originally produced on a motherglass to reduce cost and subsequently separated. The separate alignment region 388 of theisotropic material 382 constitutes a second alignment feature. The alignment region 388 in this embodiment has substantially the same structure as the optical microstructure 380, and can thus be mastered at the same time as the optical microstructure, and with the same tolerances. A gap region 392 may be incorporated between the optical microstructure 380 and the alignment microstructure 388. This may be used to produce a spatial phase offset between the two structures to optimise the setting of the measurement apparatus. For example, at the edge of the display, the lenses may not be aligned with the centre line of the pixels, because of the view point correction as shown in FIG. 8. In the alignment region, the lenses may be positioned centrally on to the pixels to optimise the measurement of the relative alignment. Thus there is a phase offset in lateral position of the lenses between the optical microstructure and the alignment microstructure.

The alignment region 380 forming the alignment feature of the lens substrate 376 has a surface relief which is the inverse shape of the surface relief of the alignment feature 342 of the display substrate, so that the two surface reliefs register with each other. During the alignment process, the alignment region 388 and alignment feature 342 are mated together mechanically as shown in FIG. 18. Advantageously, this can be achieved using simple alignment apparatuses, and thus does not require a precision alignment during the assembly of a single panel. The mating process can take place following the separation of the display substrate and lens substrate 376. Following the mechanical alignment, the gap between the lens substrate 376 and the display substrate may be filled with an index matching material and the alignment cured. An additional index matching material 394 may be inserted to reduce reflections from the surfaces. Alternatively, the Microsheet 386 may be omitted and appropriate alignment layers formed on lens and substrate surfaces. The alignment may be set by means of UV curable liquid crystal material or other curable adhesive. The liquid crystal material 378 may be used to fill the gap subsequent to the alignment step.

In some configurations, waveplates and/or polarisers may be fitted to the colour filter substrate prior to assembly with the optical element. These can be fitted to the panel or the lens prior to fitting of the switchable 2D-3D elements. The height of the alignment feature region can be increased to compensate for the thickness of these additional elements.

It will be clear to those skilled in the art that the alignment of the optical elements can be fixed during manufacture of the motherglass and thus be applied to multiple panels simultaneously. The fitting of the optical elements to individual panels is a straightforward mechanical mating process and is thus low tolerance by virtue of the 'key' attached to the motherglass and a low cost process. By fabricating the alignment region 388 at the same time as the optical microstructure 380 then high precision alignment tolerances can be maintained.

The pitch of the alignment features 388, 380 is set to be the same, or an integer multiple of the pitch of the lenses of the optical microstructure. In this way, if there is a phase error in the positioning (ie lens 1 corresponds to pixel columns 3 and 4 rather than 1 and 2), then the output of the display is not altered. This means that the starting position of the lens with respect to the panel does not need to be strictly monitored, further increasing the yield of the process.

In this way, the precision alignment is achieved on the motherglass in a manner by which the motherglass can be satisfactorily separated, and the single panel alignment is a simple mechanical registration which is a low cost, high yield process.

Figure 19:
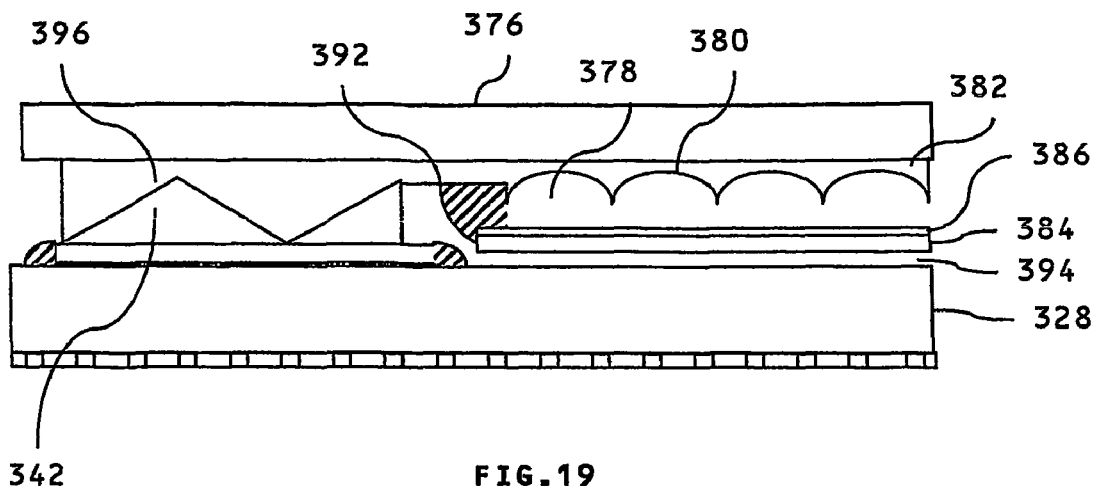
FIG. 19 shows an alternative alignment structure.

In alternative embodiments, for example as shown in FIG. 19, the alignment region microstructure 396 may be different to the optical microstructure, for example with a deeper structure or different profile shape to improve the mechanical fit to the alignment feature 388. However, the pitch of the structure is preferably maintained to be an integer multiple of the pitch of the optical microstructure, so as to produce convenient alignment of the structures. In further embodiments, the alignment feature may have a form such as cones, truncated cones, or pyramids.

The method described above involves forming the display substrate by dividing motherglass 320 and forming the lens substrate 376 by dividing a motherglass. In practice it is expected to be clear to a skilled person from inspection of a divided display substrate or lens substrate 376 that the alignment elements have been fabricated on the motherglass, rather than on the substrate after dividing from the motherglass. This is for the following reasons.

In motherglass processed alignment features, the polymer is typically required to be cut prior to dividing the glass of the panel. Such cutting of the polymer on glass will typically leave distinctive cut marks on the alignment polymer and (where used) on the adhesive used to attach the alignment polymer to the glass. These may be particularly seen at the top and bottom of the alignment features. If the alignment feature were to be applied after the panel has been divided then either the polymer will be applied in strips which are pre-cut and glued to the glass; or will be cured in situ.

In the case in which the polymer is pre-cut and subsequently attached to the panel the form of the polymer cut mark will be different from a motherglass polymer cut mark. In particular there may be evidence of the adhesive used to attach the feature to the glass leaking out from under the end of the feature which could not happen in a motherglass cured element.

In the case where the alignment feature is cured in-situ to the separate panel, typically no cut marks will be present at either ends of the features, thus indicating that the element was not made at the motherglass stage.

In a panel which has been divided from a motherglass, there may also be evidence of residual polymer attached to the glass in the region from which the polymer has been removed, after the polymer element has been delaminated for glass cleaving. Such polymer would typically be a thin layer from the borders of the alignment feature. Such residual polymer may extend to the edge of the glass area, indicating that the polymer covered more than one panel on the motherglass area. It may also be possible to detect evidence of attempts to remove such excess polymer.

Figure 20:
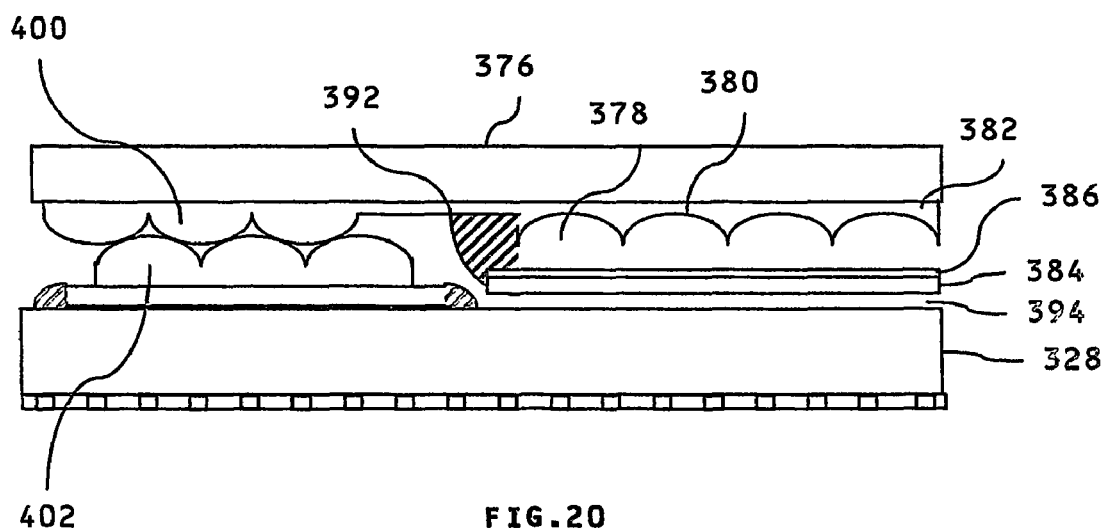
FIG. 20 shows a further embodiment of the invention comprising mating convex lens shapes.

In further structures, the features may mate at a reduced number of contact points, for example as shown in FIG. 20. The features in this case, may for example be inverted, convex lens structures 400 of the same pitch as the optical lenses. The structures 402 on the display substrate are also convex lenses of the same pitch, but are offset horizontally by half a structure pitch. Such a configuration advantageously reduces the number of contact points of the two elements with respect to each other, thus reducing the effects of contamination falling into the gap between the elements on the display alignment and thus increasing yield.

To reduce inventory, it may be desirable that the alignment features are fitted to all 2D display panels, with subsequent fitting of the 3D elements taking place at a later stage or in a lower cost facility.

The same technique can be used for other optical elements such as parallax barriers, active lenses, holograms etc in which the optical microstructure 380 is replaced by the slits of a parallax barrier, which may be a retarder barrier for example, or by hologram elements. Alternatively, the structure may incorporate fixed refractive index lenses for a non-switched lenticular system.

The alignment features may also be fitted to single panels after panel assembly, to allow subsequent fitting of optical elements. The optical component may alternatively be a parallax barrier for example. In the alignment of the alignment feature to the display motherglass, the alignment structure may be arranged to provide an illumination spot at the pixel plane of similar size to that produced by a slit of the parallax barrier.

Although the above embodiment relates to a display substrate in which the spatial light modulator is a TFT-LCD, that is a transmissive spatial light modulator, the present invention is equally applicable to any other type of spatial light modulator including one which is emmissive.

Different features of the embodiment may provide the following advantages singly or in any combination.

Motherglass assembly of alignment features for an optical element is enabled.

The optical element may be fitted conveniently and cheaply back of line.

Simple assembly of directional display optical elements to completed display modules are also possible for after factory fitting.

The convenient assembly of more than two glass substrates is facilitated.

The alignment features for the lens are integrated in to the design of the lens structure and can be processed in a single step The absolute alignment of the lens structure is not required. The alignment is required to be correct with reference to the centre of a lens, however the precise lens element which it is aligned to may vary.

The alignment feature may also have the form of a top hat function. In this way, the lateral position of the alignment is substantially fixed, but the relative height of the alignment features is less critical in order to maintain lateral alignment. Therefore the female part of the key may be deeper than the height of the male part when the two are mated, so that the mating interface does not set the vertical separation between the components.

The same tool to replicate the lenses may be used to replicate the alignment structures.

The alignment features may be conveniently aligned and attached to the panel mother glass prior to dicing, so that alignment for each panel is accomplished.

Polarisers and waveplates may be attached to the diced displays prior to fitting of the display optics.

The optical elements may be fitted to the panel after panel assembly with minimal alignment tolerances and without the need for expensive alignment equipment for each individual panel by using the attached alignment element.

The microlenses may be assembled to the panel without the requirement for processing of surfaces of the assembled display motherglass.

The invention claimed is:

1. A method of aligning display substrates comprising an array of pixels with component substrates comprising an array of optical components, the method comprising:
    forming a display motherglass with an array of panels each comprising an array of visible pixels sufficient for a single display substrate and with, in respect of each panel, a first alignment feature arranged outside the array of visible pixels and having a surface relief aligned with the array of pixels of the respective panel;
    dividing the display motherglass into display substrates each comprising an array of pixels and a first alignment feature;
    forming component substrates each with an array of optical components and a second alignment feature having a surface relief aligned with the array of optical components, the surface relief of the second alignment feature being shaped to register with the surface relief of the first alignment feature, wherein the surface relief of the second alignment feature repeats in the same direction in which the optical components repeat at a pitch substantially equal to the pitch of the optical components or an integer multiple of the pitch of the optical components; and
    attaching the display substrates to respective component substrates with the first and second alignment features in registration with each other.

2. A method according to claim 1, wherein the step of forming the display motherglass comprises forming the display motherglass with an array of panels each comprising an array of pixels sufficient for a single display substrate and attaching the first alignment features to the display motherglass.

3. A method according to claim 2, wherein the first alignment feature has an optical function and the step of attaching the first alignment features to the display motherglass includes aligning the surface relief of the first alignment features with the array of pixels using an optical alignment technique.

4. A method according to claim 1, wherein the step of forming component substrates comprises
    forming a component motherglass with an array of panels each comprising an array of optical components sufficient for a single component substrate and with, in respect of each panel, a second alignment feature aligned with the array of optical components, and
    dividing the component motherglass into display substrates each comprising an array of optical components and a second alignment feature.

5. A method according to claim 1, wherein
    the second alignment feature is formed in a common layer with part of the structure of the optical component, and
    the step of forming component substrates comprises forming the common layer with both the second alignment feature and said part of the structure of the optical component.

6. A method according to claim 1, wherein the first alignment feature has the same optical function as the optical component.

7. A method according to claim 1, wherein the surface relief of the first alignment feature repeats in the same direction in which the optical components repeat at a pitch substantially equal to the pitch of the optical components.

8. A method according to claim 1, wherein the surface relief of the first alignment feature repeats in the same direction in which the optical components repeat at a pitch substantially equal to an integer multiple of the pitch of the optical components.

9. A method according to claim 1, wherein the optical components have a focal length and the first alignment feature has a height above the array of pixels substantially equal to the focal length of the optical components.

10. A method according to claim 1, wherein the first alignment feature comprises a micro-structure layer on a support layer.

11. A method according to claim 1, wherein the surface reliefs of the first and second alignment features have inverse shapes.

12. A method according to claim 1, wherein the display substrate comprises an active matrix substrate for a display panel and a counter substrate.

13. A method according to claim 1, wherein the optical components are lenses.

14. A display apparatus comprising a display substrate comprising an array of visible pixels attached to a component substrate comprising an array of optical components, wherein the display substrate has a first alignment feature arranged outside the array of visible pixels and, aligned with the array of visible pixels, the component substrate has a second alignment feature aligned with the array of optical components, and the first and second alignment features have respective surface reliefs in registration with each other, wherein the surface relief of the second alignment feature repeats in the same direction in which the optical components repeat at a pitch substantially equal to the pitch of the optical components or an integer multiple of the pitch of the optical components.

15. A display apparatus according to claim 14, wherein the first alignment feature is attached to the display substrate.

16. A display apparatus according to claim 15, wherein the first alignment feature has an optical function.

17. A display apparatus according to claim 16, wherein the optical function of the first alignment feature is the same as the optical function of the optical components.

18. A display apparatus according to claim 14, wherein the second alignment feature is formed in a common layer with part of the structure of the optical component.

19. A display apparatus according to claim 14, wherein the surface relief of the first alignment feature repeats in the same direction in which the optical components repeat at a pitch substantially equal to the pitch of the optical components.

20. A display apparatus according to claim 14, wherein the surface relief of the first alignment feature repeats in the same direction in which the optical components repeat at a pitch substantially equal to an integer multiple of the pitch of the optical components.

21. A display apparatus according to claim 14, wherein the optical components have a focal length and the first alignment feature has a height above the array of pixels substantially equal to the focal length of the optical components.

22. A display apparatus according to claim 14, wherein the first alignment feature comprises a micro-structure layer on a support layer.

23. A display apparatus according to claim 14, wherein the surface reliefs of the first and second alignment features have inverse shapes.

24. A display apparatus according to claim 14, wherein the display substrate comprises an active matrix substrate for a display panel and a counter substrate.

25. A display apparatus according to claim 14, wherein the optical components are lenses.

26. A display apparatus according to claim 14, wherein the display substrate has been formed by division from a motherglass.

27. A display apparatus according to claim 14, wherein the component substrate has been formed by division from a motherglass.

28. A display substrate comprising an array of pixels for attachment to a component substrate comprising an array of optical components, wherein the display substrate has a first alignment feature having a surface relief arranged outside the array of visible pixels and aligned with the array of pixels, wherein the surface relief of the first alignment feature repeats in the same direction in which optical components on a component substrate repeat at a pitch substantially equal to the pitch of the optical components or an integer multiple of the pitch of the optical components.

29. A display substrate according to claim 28, wherein the first alignment feature is attached to the display substrate.

30. A display substrate according to claim 28, wherein the first alignment feature has an optical function.

31. A display substrate according to claim 28 wherein the first alignment feature comprises a micro-structure layer on a support layer.

32. A display substrate according to claim 28, wherein the display substrate comprises an active matrix substrate for a display panel and a counter substrate.

33. A display substrate according to claim 28, wherein the display substrate has been formed by division from a motherglass.

34. A component substrate comprising an array of optical components for attachment to a display substrate comprising an array of visible pixels and a second alignment feature arranged outside the array of optical features to be aligned with the array of visible pixels of the display substrate and having a surface relief aligned with the array of optical components, wherein the surface relief of the second alignment feature repeats in the same direction in which the optical components repeat at a pitch substantially equal to the pitch of the optical components or an integer multiple of the pitch of the optical components.

35. A component substrate according to claim 34, wherein the second alignment feature is formed in a common layer with part of the structure of the optical component.

36. A component substrate according to claim 34, wherein the optical components are lenses.

37. A component substrate according to claim 34, wherein the component substrate has been formed by division from a motherglass.

38. A display motherglass comprising an array of panels each comprising an array of visible pixels sufficient for a single display substrate and with, in respect of each panel, a first alignment feature having a surface relief arranged outside the array of visible pixels and aligned with the array of visible pixels, wherein the surface relief of the first alignment feature repeats in the same direction in which optical components on a component substrate repeat at a pitch substantially equal to the pitch of the optical components or an integer multiple of the pitch of the optical components.

39. A display motherglass according to claim 38, wherein the first alignment feature is attached to the display motherglass.

40. A display motherglass according to claim 39, wherein the first alignment feature has an optical function.

41. A display motherglass according to claim 38, wherein the first alignment feature comprises a micro-structure layer on a support layer.

42. A display motherglass according to claim 38, wherein the display motherglass comprises an active matrix substrate for a display panel and a counter substrate.

43. A component motherglass comprising an array of panels each comprising an array of optical components sufficient for a single component substrate for attachment to a display substrate comprising an array of visible pixels, and, in respect of each panel, a second alignment feature arranged outside the array of optical features to be aligned with the array of visible pixels of the display substrate and aligned with the array of optical components, wherein the surface relief of the second alignment feature repeats in the same direction in which the optical components repeat at a pitch substantially equal to the pitch of the optical components or an integer multiple of the pitch of the optical components.

44. A component motherglass according to claim 43, wherein the second alignment feature is formed in a common layer with part of the structure of the optical component.

45. A component motherglass according to claim 43, wherein the optical components are lenses.

* * * * *